United States Patent Office 2,990,367
Patented June 27, 1961

2,990,367
CLAY-BODIED LUBRICANT CONTAINING A SILICATE ESTER
Edgar W. Sawyer, Jr., Pennsauken, and Walter Linwood Haden, Jr., Barrington, N.J., assignors to Philipp Corporation, a corporation of Maryland
No Drawing. Filed June 21, 1954, Ser. No. 438,314
15 Claims. (Cl. 252—28)

This invention relates to bodied lubricants of the type generally referred to as "greases" and more particularly to the incorporation of additives in clay-bodied greases to improve the compatibility thereof with greases bodied with metallic soaps. As used therein "clay-bodied greases" and similar expressions denote greases gelled with clay in which the gel results from a colloidal dispersion of lyophilic clay.

Previously, methods have been described for preparing greases, and increasing the consistency of liquids by colloidally dispersing therein a gel forming amount of clay, made organophilic either by adsorbing thereon polar compounds or reacting the clay with an onium compound. Thus, high quality greases have been prepared from Georgia-Florida type fuller's earth (attapulgite), subbentonite, and other clays; for example, as taught in co-pending U.S. application, Serial No. 245,774, filed September 8, 1951, now U.S. Patent No. 2,885,360, simply by colloidally dispersing a gelling amount of the clay in a lubricating liquid in the presence of a surface-active agent. The surfactant may be cationic or mixtures of cationic and nonionic or mixtures of cationic and anionic agents. Similarly greases may be made by dispersing in a lubricating liquid a gel forming quantity of bentonite clay which has been rendered organophilic by reaction with an onium compound, as disclosed in U.S. Patent No. 2,662,056 and other recently issued patents.

In spite of the good thermal properties exhibited by these greases when they contain no other types of greases, in industrial use the possibility of contamination by other industrial greases is very probable. Such clay-bodied greases when subjected to about five to ten percent contamination with greases consisting of a lubricating oil and a metallic soap, hereinafter referred to as "soap greases," undergo an appreciable change in their physical properties. That is, they tend to degel and have a lowered melting point where previously they had either a high melting point or no melting point. This would cause poor operation under field conditions when the contaminated grease is used to lubricate bearings and other parts subjected to high temperatures. When the temperature exceeds certain points the grease either degels or softens sufficiently to run out of the lubricated part and thus causes a failure due to lack of lubrication.

While not being bound by any particular theory it has been postulated that the degellation is caused in part by the increase in pH of the contaminated mixture due to the higher pH of the soap grease contaminant. Another possible cause in part is believed to be the increase in level of metallic cation content of the contaminated grease.

Accordingly, one object of the present invention is to provide a means for overcoming the aforesaid difficulties.

Another object of this invention is to provide an improved clay-bodied lubricant characterized by good thermal properties when contaminated with about five to ten percent soap grease.

A further object is to provide an improved clay-bodied lubricant comprising a lubricating liquid and a dispersion of colloidal lyophilic clay, in gelling amount, and containing an additive in sufficient amount to improve thermal properties of the above described grease when contaminated with a soap grease.

Other objects and features of this invention will be apparent from the description and examples which follow.

We have discovered that greases when prepared as specified above having minor amounts of silicate esters incorporated in the grease have the ability to withstand contamination by soap greases without being subject to the deleterious softening effects at higher temperatures as is characteristic of untreated greases. We have found that the properties of clay-bodied grease contaminated with soap greases are materially improved by the presence of 0.1 to 5 percent of a silicate ester based on the weight of the grease. Larger amounts of the silicate ester may be used in certain applications without adversely affecting the properties of the finished grease. The operating temperature range in which these additives are effective is from room temperature to about 250° F. Contaminating soap base greases are those gelled with the sodium, calcium, lithium, aluminum, or barium soaps of stearic, oleic, palmitic, lauric, 12-hydroxystearic or commercially available mixtures ranging from $C_{12}$ to $C_{22}$ in chain length fatty acids, or a mixture of such soaps. This invention is applicable to any lubricant bodied with clay in which the clay exists as a suspension of organophilic colloidal particles in a liquid lubricating medium of an organic nature, natural or synthetic. Thus, the invention includes the improvement of greases prepared, for example, by the method disclosed in copending U.S. application, Serial No. 245,774, filed September 8, 1951, which involves the direct dispersion of clay in a lubricating liquid in the presence of a surface-active agent as well as greases prepared by a process such as described in U.S. Patent No. 2,662,056, and other recently issued patents involving the dispersions in a lubricating liquid of an organophilic clay.

In accordance with this invention, additives may be incorporated in a finished grease. This may be accomplished by adding the desired amount of a silicate ester to the finished grease and forming a relatively homogeneous mixture by methods known to those skilled in the art. The additive may also be incorporated into the grease at some intermediate stage in the preparation of the grease.

The term silicate esters as used herein means substituted, unsubstituted and condensed silicate esters, and includes the lower alkyl and aryl silicates, alkyl and aryl alkoxy silanes and alkyl and aryl aryloxy silanes, specifically those subject to hydrolysis under mild alkaline conditions. Preferably, the alkyl group or groups, if any, of the silicate ester contain from 1 to 4 carbon atoms, and the aryl group or groups, if any, of the silicate ester comprise a phenyl or alkylated phenyl group of lower molecular weight. These silicates include such compounds as ethyl ortho silicate, methyl triethoxy silane, tetra phenoxy silane, tetra cresoxy silane, diethoxy diphenoxy silane, phenyl triethoxy silane, hexaethoxy disiloxane and higher polymers. Excellent results have been obtained with ethyl orthosilicate in petroleum oils.

In accordance with this invention, our novel grease compositions may be prepared by dispersing a suitable raw clay in water and allowing the dispersion to stand to permit coarse particles to settle out; after which, clay larger than a selected maximum size may be substantially eliminated by centrifuging or other suitable classifying means. The resultant slurry is then dried to yield clay particles substantially not larger than the desired maximum particle size and having a free moisture content from about five percent to about 30 percent by weight.

The above clay, together with a proper amount of a suitable surfactant or mixture of surfactants, which functions as a dispersing agent and coating agent and other desired materials for inhibitors, is mixed with the lubricating oil; and the mixture is subjected to shear or agitation in suitable equipment such as, for example, a high speed mixer, colloid mill or a similar device. It is preferable while continuously agitating or otherwise applying shear to the mixture to heat it sufficiently to raise the temperature to a point at which the free moisture in the clay will vaporize. Coinciding with moisture vaporization will be a gellation. The application of shear is continued until maximum grease consistency has been obtained.

An addition of 0.1 to 5.0 percent silicate ester can be made to the finished grease at this point or at some previous step after the beginning of moisture vaporization by passing a mixture of the grease through some type of milling or homogenizing device. The finished grease, which is the subject of the present invention has excellent thermal properties even when contaminated with soap grease.

As hereinbefore pointed out, the silicate ester may be incorporated in the finished grease or in some processing stage after preliminary moisture vaporization has been started.

Any naturally occurring colloidal clay may be used in the practice of this invention as swelling bentonite, the sub-bentonites, nontronite, illite, hectorite, beidellite, saponite, halloysite, and fuller's earth, particularly of the Georgia-Florida type which is commonly referred to as attapulgite. Attapulgite is particularly suitable in the practice of this invention.

The lubricating liquids which comprise the major ingredient of our novel grease compositions are preferably mineral lubricating oils, particularly petroleum lubricating oil. It is to be understood, however, that it is within the scope of the subject invention to utilize any other lubricating liquids, such as any of the numerous synthetic lubricating liquids. These synthetic lubricants are exemplified by silicone polymers, alkyl esters of dicarboxylic organic acids, polymers of alkylene glycol, etc.

The surface active agent may be any suitable cyclic, aliphatic and heterocyclic amine or mixture thereof, and preferably primary, secondary and tertiary aliphatic amines, their salts and quaternary ammonium salts, having at least one alkyl group with a total of at least 10 carbon atoms. In addition such amines may contain other functional groups such as hydroxyl, ether, ester or amide groups. Examples of such amines, amine salts and quaternary ammonium compounds are decylamine, dodecylamine, hexadecyl ammonium acetate, octadecyl ammonium acetate, dimethyldioctyl ammonium acetate, dimethyldidodecyl ammonium acetate, dimethyldodecylhexadecyl ammonium acetate, dimethyldicetyl ammonium acetate, dimethylhexadecycloctadecyl ammonium acetate, dimethyldioctadecyl ammonium acetate, and the corresponding chlorides and quaternary ammonium chlorides.

The quantity of clay in our novel greases may vary over a relatively wide range and the optimum amount in any particular case is dependent upon several factors including the type of lubricating liquid to be bodied, the dispersing agent employed and the grease consistency desired. This may range from about three to four percent by weight of clay on a volatile-free (heated to 1800° F.) basis in a high penetration grease to seven percent or more on the same basis for a grease with a low penetration. For most purposes the clay will range from about three percent to 15 percent by weight of the grease.

The quantity of surface active agent utilized in the production of our grease composition depends on the particular surfactant, the amount of clay, the type of clay and the organic liquid used; and, therefore, such quantity may vary over a relatively wide range. It has been found, however, that from one-half percent to about ten percent by weight of the dispersing agent in the mixture is usually sufficient.

The following examples are given to illustrate the improved compatibility of clay-bodied grease with a soap thickened grease, which improvement results from the incorporation in the clay-bodied grease of a minor amount of a silicate ester, in accordance with the present invention. It is to be understood, however, that these examples are given primarily for illustrative purposes and the invention in its broadest aspect is not limited thereto.

EXAMPLE I

A basic grease formulation was prepared in the following manner:

A portion of grit-free colloidal Georgia-Florida fuller's earth with a free moisture content of approximately 25% together with a quantity of solvent refined Mid-Continent type oil having a viscosity of approximately 1100 SUS at 100° F. and a viscosity index of about 84 were placed in a suitable vessel provided with a motor driven agitator and a heating coil. To this was added a quantity of Amine S, which is a product of Alrose Chemical Company consisting essentially of the imidazoline of stearic acid and amino ethyl ethanol amine. The resulting mixture was stirred while heating to a temperature sufficient to cause a portion of the free moisture to vaporize during a subsequent homogenization effected by subjecting the mixture to a shearing action of about 3,000 p.s.i.g. The resulting grease was permitted to cool and constituted the basic grease formulation mentioned above.

The quantities of fuller's earth, oil and Amine S were such that the basic grease formulation comprised on a weight basis, 8.12% fuller's earth, 2.58% Amine S and 89.30% oil. To one portion of the basic grease was added 2% by weight of ethyl silicate, and the mixture was made relatively homogeneous by stirring and pumping through a gear pump. Next, both the treated portion and the untreated grease were contaminated by mixing in each 10% of a No. 2 grade soda soap grease and thereafter were subjected to the well-known C.R.C. wheel bearing test, to determine the effect upon the high temperature properties of the grease brought about by the soda soap grease contamination. This test is described under the title, "Tentative Method of Test for Leakage Tendencies of Automotive Wheel Bearing Greases," ASTM Designation: D1263–53T, issued in 1953, found in ASTM Standards on Petroleum Products and Lubricants, November 1953, and consists essentially of subjecting the sample of grease packed in a modified front-wheel hub to a spindle temperature of 220° F. at 660 revolutions per minute for six hours. The apparatus is constructed in a manner which allows grease leaking from the hub assembly to be collected. The weight of the amount of grease lost in the six-hour period is determined. Relative amounts of grease lost in this test can be considered as one method of measuring the thermal properties of the grease tested in this simulated field test.

As a result of the wheel bearing test it was found that the basic grease formulation without the ethyl silicate addition showed a grease loss of 37.4%, whereas the same formulation with 2% ethyl silicate added showed a grease loss of only 1.5%. These data clearly show that the addition of a minor amount of a silicate ester to a clay-bodied lubricant markedly enhances the compatibility of the clay-bodied lubricant with a soap thickened lubricant.

EXAMPLE II

The procedure of Example I was repeated except that the basic grease formulation was composed of 9.06% fuller's earth, 1.35% Victamine C, 1.98% G–3825 and 87.61% oil, the Victamine C and G–3825 functioning as surface active agents. Victamine C is a product of Victor Chemical Company and comprises an alkyl ammonium salt of a mono-alkyl amido phosphate,

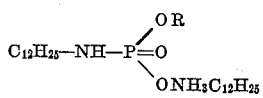

and G–3825 is a product of Atlas Powder Company which predominately is made up of stearyl amine reacted with five moles of ethylene oxide.

After being contaminated with the soda soap grease, a portion of the basic grease and also a portion of the basic grease containing 2% ethyl silicate were subjected to the C.R.C. wheel bearing test. The grease without ethyl silicate resulted in a loss of 35.5% as compared with a loss of only 8.3% of the grease containing the ethyl silicate. These data again show the improved thermal stability in the presence of a soap base grease contaminant of a clay-bodied lubricant containing a minor amount of ethyl silicate, or in other words, the improved compatibility of such a clay-bodied lubricant containing ethyl silicate over the same grease without the additive.

EXAMPLE III

By the process of Example I a basic grease formulation was prepared which comprised 8.12% fuller's earth, 2.58% Amine O and 89.30% oil. Amine O is a product of Alrose Chemical Company consisting essentially of imidazoline of oleic acid and amino ethyl ethanol amine.

There was incorporated in one portion of this basic grease 1% ethyl silicate; in another portion 2% ethyl silicate was incorporated; and in the remaining grease no additive was incorporated. After being contaminated with 10% of soda soap grease, the three portions were then tested by the C.R.C. wheel bearing test procedure. It was determined that the grease with no additive showed a loss of over 50% by weight, whereas the portion with 1% ethyl silicate exhibited a loss of only 8.3% and the portion with 2% ethyl silicate exhibited a loss of only 0.56%.

Once again, these data clearly demonstrate that the addition of a small amount of a silicate ester, in accordance with our invention, to a clay-bodied lubricant results in a marked improvement of the compatibility of the clay-bodied lubricant with a soap thickened lubricant.

EXAMPLE IV

A basic grease formulation was prepared by milling 9.2% by weight of the reaction product of dioctadecyl dimethyl ammonium chloride and a swelling bentonite, prepared as described in U.S. Patent 2,662,056, into an oil. To one portion of the resultant grease 2% ethyl silicate was added, and the sample was made relatively homogeneous by mixing and pumping through a gear pump. Both the basic grease and the improved grease were tested, by contaminating them with 10% of the soap greases listed in Table I and running the contaminated greases in the wheel bearing tester under the prescribed conditions. In addition to the determination of leakage as a criterion of the thermal properties of the contaminated greases, half-scale cone penetrations were run on the contaminated greases before the wheel bearing test, after the wheel bearing test while the mixture was still hot, and after the wheel bearing test when the mixture had cooled. The results are presented in Table I.

Table I

| Sample | Ethyl Silicate (Percent) | Contaminant Grease | Leakage, gms./90 gms. of sample | Half-Scale Cone Penetration | | |
|---|---|---|---|---|---|---|
| | | | | Initial | Final Hot | Final Cold |
| 1-A | 0 | #2 Soda | 2.0 | 135 | 164 | 164 |
| 1-B | 2 | do | 0.0 | 107 | 120 | 147 |
| 2-A | 0 | #2 Li 12-hydroxy-stearate. | 0.3 | 132 | 171 | 153 |
| 2-B | 2 | do | 0.2 | 113 | 134 | 132 |
| 3-A | 0 | #2 Al Soda | 1.6 | 130 | 188 | 182 |
| 3-B | 2 | do | 1.1 | 117 | 153 | 185 |
| 4-A | 0 | #2 Lime | 35.5 | 121 | 230 | 214 |
| 4-B | 2 | do | 0.0 | 112 | 157 | 148 |
| 5-A | 0 | #1 Al | 5.5 | 123 | 175 | 168 |
| 5-B | 2 | do | 0.8 | 118 | 174 | 172 |

Referring to the results shown in Table I, it can be seen that with this type of grease the major improvement is shown on the samples of grease contaminated with the No. 2 lime grease and the No. 1 aluminum grease when leakage is considered as a standard of improvement. Moreover, when the half-scale cone penetrations are considered, the data representing the penetrations run on the hot contaminated greases after the wheel bearing test show that the penetrations are much lower in the case of the grease treated with two percent ethyl silicate.

EXAMPLE V 11.5 grams of V.M.-free attapulgite was mixed with 3.76 grams of G–3825, 1.87 grams of Victamine C, and 121 grams of a Mid-Continent solvent refined oil with a viscosity of 1100 SUS at 100° F. and a V.I. of 84. The mixture was processed into a grease by the procedure above described. The grease was then divided into two portions, one being treated with 2% ethyl silicate as described in Example IV. Both portions were contaminated with 10% of the soap greases shown in Table II, and subjected to the wheel bearing test with half-scale cone penetrations being determined as in Example IV. The results are given in Table II.

Table II

| Sample | Ethyl Silicate (Percent) | Contaminant Grease | Leakage, gms./90 gms. of sample | Half-Scale Cone Penetration | | |
|---|---|---|---|---|---|---|
| | | | | Initial | Final Hot | Final Cold |
| 1-A | 0 | #2 Soda | 18.7 | 123 | 157 | 122 |
| 1-B | 2 | do | 0.0 | 132 | 101 | 82 |
| 2-A | 0 | #2 Li 12-hydroxy stearate. | 0.0 | 125 | 133 | 166 |
| 2-B | 2 | do | 0.0 | 137 | 92 | 90 |
| 3-A | 0 | #2 Al Soda | 0.0 | 161 | 158 | 225 |
| 3-B | 2 | do | 0.0 | 139 | 97 | 140 |
| 4-A | 0 | #2 Lime | 18.6 | 130 | 179 | 173 |
| 4-B | 2 | do | 0.8 | 157 | 110 | 147 |
| 5-A | 0 | #1 Al | 0.1 | 129 | 136 | 168 |
| 5-B | 2 | do | 0.0 | 135 | 92 | 64 |

By reference to the leakage results tabulated in Table II, it is seen that a marked and unexpected improvement in compatibility properties are effected by the 2% ethyl silicate addition. It is particularly striking on the grease samples contaminated with 10% of No. 2 soda grease and the No. 2 lime grease. A very marked improvement in the penetrations run on the hot sample after the test is noticed.

We claim:

1. A bodied lubricant comprising a lubricating fluid the consistency of which has been increased by a colloidal dispersion of a lyophilic clay, and a silicate ester in an amount sufficient to reduce undesirable degelling of the bodied lubricant on contact with soap grease, said silicate ester being selected from the group consisting of esters of lower alkyl and aryl silicates and their polymers.

2. A bodied lubricant comprising a lubricating fluid the consistency of which has been increased by a colloidal dispersion of a lyophilic clay, and a silicate ester which hydrolyzes in an alkaline medium in an amount sufficient to reduce undesirable degelling of the bodied lubricant on contact with soap grease, said silicate ester being selected from the group consisting of esters of lower alkyl and aryl silicates and their polymers.

3. A bodied lubricant comprising a lubricating fluid the consistency of which has been increased by a colloidal dispersion of an organophilic clay, said clay being made organophilic by adsorbing cationic agents on the surface thereof and a silicate ester in an amount sufficient to reduce undesirable degelling of the bodied lubricant on contact with soap grease, said silicate ester being selected from the group consisting of esters of lower alkyl and aryl silicates and their polymers.

4. An improved grease comprising a lubricating fluid the consistency of which has been increased by a colloidal dispersion of a clay in an amount of from 3% to 15% of the lubricating fluid, said clay having adsorbed thereon a cationic agent in an amount of from ½% to 10% of the lubricating fluid, and a silicate ester in an amount sufficient to reduce undesirable degelling of the bodied lubricant on contact with soap grease, said silicate ester being selected from the group consisting of esters of lower alkyl and aryl silicates and their polymers.

5. The improved grease of claim 4 in which the silicate ester is present in the amount of from 0.1% to 5% by weight of the lubricating fluid.

6. The improved grease of claim 4 in which the silicate ester is one which hydrolyzes in an alkaline medium.

7. An improved grease comprising a lubricating fluid the consistency of which has been increased by a colloidal dispersion of attapulgite in an amount from 3% to 15% of the lubricating fluid, said clay having adsorbed thereon a mixture of the dodecyl ammonium salt of monoethyl N-dodecyl amido phosphate and a reaction product of stearyl amine with five equivalents of ethylene oxide in an amount of from ½% to 10% of the lubricating fluid, the weight ratio of said amido phosphate to the said reaction product of stearyl amine and ethylene oxide being about 1:1.5, and ethyl silicate in an amount of 0.1 to 5% of the lubricating fluid.

8. The improved grease of claim 5 wherein the adsorbed cationic agent is the reaction product of oleic acid and amino ethyl ethanol amine and has the structural formula:

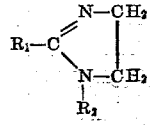

where $R_1$ is $CH_3(CH_2)_7 \cdot CH=CH \cdot (CH_2)_6 \cdot CH_2-$ and $R_2$ is $HO \cdot CH_2 \cdot CH_2-$.

9. The improved grease of claim 5 in which the adsorbed cationic agent is the reaction product of stearic acid and amino ethyl ethanol amine and has the structural formula:

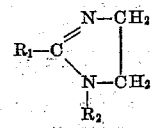

where $R_1$ is heptadecyl and $R_2$ is ethanol.

10. A bodied lubricant comprising a lubricating liquid the consistency of which has been increased by a colloidal dispersion of a compound of bentonite and an organic nitrogen base, and a silicate ester in an amount sufficient to reduce undesirable degelling of the bodied lubricant on contact with soap grease, said silicate ester being selected from the group consisting of esters of lower alkyl and aryl silicates and their polymers.

11. An improved grease comprising a mineral lubricating oil the consistency of which has been increased by a colloidal dispersion of dioctadecyl dimethyl ammonium bentonite in an amount of from 3 to 30% of the mineral lubricating oil, and a silicate ester in an amount sufficient to reduce undesirable degelling of the bodied lubricant on contact with soap grease, said silicate ester being selected from the group consisting of esters of lower alkyl and aryl silicates and their polymers.

12. The improved grease of claim 11 in which the silicate ester is ethyl silicate.

13. The improved grease of claim 12 in which the ethyl silicate is present in the amount of from 0.1 to 5% of the lubricating oil.

14. A bodied lubricant comprising a lubricating fluid the consistency of which has been increased by a colloidal dispersion of a lyophilic clay, and a minor amount of a silicate ester, said silicate ester being selected from the group consisting of esters of lower alkyl and aryl silicates and their polymers.

15. A bodied lubricant comprising a lubricating fluid the consistency of which has been increased by a colloidal dispersion of a lyophilic clay, and a minor amount of a silicate ester which hydrolyzes in an alkaline medium, said silicate ester being selected from the group consisting of esters of lower alkyl and aryl silicates and their polymers.

References Cited in the file of this patent

UNITED STATES PATENTS

| | | |
|---|---|---|
| 2,531,440 | Jordan | Nov. 28, 1950 |
| 2,623,853 | Stross | Dec. 30, 1952 |
| 2,643,263 | Morgan | June 23, 1953 |
| 2,662,056 | McCarthy | Dec. 8, 1953 |
| 2,681,313 | Kather et al. | June 15, 1954 |
| 2,735,816 | Merker et al. | Feb. 21, 1956 |

OTHER REFERENCES

"Colloidal Attapulgite for Use in the Manufacture of Greases," Attapulgite Clay Co., Phila., Pa., October 20, 1952.

Polyorganosiloxanes, Organosilanes, and Orthosilicate Esters as Antioxidants, Fitzsimmons et al., Naval Research Lab. Report 4010, July 31, 1952.

UNITED STATES PATENT OFFICE
CERTIFICATE OF CORRECTION

Patent No. 2,990,367                          June 27, 1961

Edgar W. Sawyer, Jr., et al.

It is hereby certified that error appears in the above numbered patent requiring correction and that the said Letters Patent should read as corrected below.

In the grant, lines 3 and 12, and in the heading to the printed specification, lines 5 and 6, name of assignee, for "Philipp Corporation", each occurrence, read -- Minerals & Chemicals Philipp Corporation --; column 1, line 14, for "therein" read -- herein --.

Signed and sealed this 14th day of November 1961.

(SEAL)
Attest:

ERNEST W. SWIDER                                   DAVID L. LADD
Attesting Officer                                       Commissioner of Patents

USCOMM-DC